US006515980B1

(12) United States Patent
Bottomley

(10) Patent No.: US 6,515,980 B1
(45) Date of Patent: Feb. 4, 2003

(54) METHODS AND APPARATUS FOR INTERFERENCE CANCELLATION USING COMPLEX INTERFERENCE ORTHOGONALIZATION TECHNIQUES

(75) Inventor: Gregory Edward Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/401,565

(22) Filed: Sep. 22, 1999

(51) Int. Cl.[7] .............................................. H04B 7/216

(52) U.S. Cl. ...................... 370/342; 370/335; 370/328; 370/329; 370/441; 375/147; 375/148

(58) Field of Search ................................ 370/342, 503, 370/509, 441, 335, 328, 329; 375/130, 350, 343, 230, 324, 229, 147, 148; 455/213, 307, 296, 226.3, 222

(56) References Cited

U.S. PATENT DOCUMENTS

| | | | | |
|---|---|---|---|---|
| 5,218,619 A | * | 6/1993 | Dent ............................... | 375/1 |
| 5,572,552 A | * | 11/1996 | Dent et al. ................... | 375/343 |
| 5,615,209 A | | 3/1997 | Bottomley ................... | 370/342 |
| 5,673,291 A | | 9/1997 | Dent ........................... | 375/262 |
| 5,677,930 A | * | 10/1997 | Bottomley ................... | 375/208 |
| 5,805,567 A | * | 9/1998 | Ramesh ...................... | 370/204 |
| 5,809,020 A | * | 9/1998 | Bruckert et al. ............ | 370/335 |
| 5,917,829 A | * | 6/1999 | Hertz et al. ................. | 370/479 |
| 6,208,684 B1 | * | 3/2001 | Yellin et al. ................. | 375/144 |

FOREIGN PATENT DOCUMENTS

| | | |
|---|---|---|
| EP | 0 721 264 A1 | 7/1996 |
| EP | 0 884 855 A1 | 12/1998 |
| WO | WO 98/18210 | 4/1998 |

OTHER PUBLICATIONS

Adachi et al., "Wideband DS–CDMA for Next–Generation Mobile Communications Systems," IEEE Communications Magazine, Sep., 1998, pp. 56–69.
Barbosa et al., "Adaptive Detection of DS/CDMA Signals in Fading Channels," IEEE Trans. Commun., vol. 46, pp. 115–124, Jan. 1998.
Bottomley et al., "Adaptive Arrays and MLSE Equalization," Proc. 1995 IEEE 45$^{th}$ Vehicular Technology Conference (VTC '95), Chicago, Jul. 25–28, 1995, 5 pgs.
Bottomley, "Optimizing the Rake Receiver for the CDMA Downlink," Proceedings of the 43$^{rd}$ IEEE Vehicular Technology Conference, Secaucus, NJ, May 18–20, 1993.

(List continued on next page.)

Primary Examiner—Edward F. Urban
Assistant Examiner—Marceau Milord
(74) Attorney, Agent, or Firm—Myers Bigel Sibley & Sajovec

(57) ABSTRACT

A communications signal including components associated with desired and interfering signals that are modulated according to respective first and second modulation sequences is processed to generate a baseband signal. The baseband signal is correlated with the first modulation sequence, e.g., a combination of a first scrambling sequence and a first spreading sequence, to produce a first correlation output. The baseband signal is also correlated with a combination of the first modulation sequence and a complex component (e.g., a second scrambling sequence) of the second modulation sequence, to generate a second correlation output. The first and second correlation outputs are combined to generate an estimate of information represented by the first signal, for example, by combining the first and second correlation outputs to produce a first RAKE finger output and combining the first RAKE finger output with a second RAKE finger output to generate an estimate of information represented by the desired signal. Related receiver apparatus is also discussed.

39 Claims, 9 Drawing Sheets

OTHER PUBLICATIONS

Dahlman et al., "UMTS/IMT–2000 Based on Wideband CDMA," IEEE Communications Magazine, Sep. 1998, pp. 70–80.

Davis et al., "A Noise Whitening Approach to Multiple–Access Noise Rejection–Part II: Implementation Issues," IEEE Journal on Selected Areas in Communications, vol. 14, Oct. 1996, pp. 1488–1499.

Dent et al., "CDMA–IC: A Novel Code Division Multiple Access Scheme Based on Interference Cancellation," in Proc. PIMRC, Boston, Massachusetts, pp. 4.1.1–4.1.5, Oct. 1992.

Dinan et al., "Spreading Codes for Direct Sequence CDMA and Wideband CDMA Cellular Networks," IEEE Communications Magazine, Sep. 1998, pp. 48–54.

Duel–Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Gumas, "A Century Old, the Fast Hadamard Transform Proves Useful in Digital Communications," Personal Engineering, Nov. 1997, pp. 57–63.

Harris et al. "Handbook of Mathematics and Computer Science," published by Springer–Verlag, New York, 1998, pp. 456–457.

Hottinen et al., "Multi–User Detection for Multi–Rate CDMA Communications," in Proc. IEEE Int. Conf. Commun., Dallas, Texas, Jun. 24–28, 1996.

Jamal et al., "Adaptive MLSE Performance on the D–AMPS 1900 Channel," IEEE Transactions on Vehicular Technology, vol. 46, Aug. 1997, pp. 634–641.

Juntti, M.J., "Multi–User Detector Performance Comparisons in Multi–Rate CDMA Systems," in Proc. IEEE VTC '98, pp. 31–35, Ottawa, Canada, May 1998.

Juntti, M.J., "System Concept Comparisons for Multi–Rate CDMA with Multi–User Detection," in Proc. IEEE VTC '98, pp. 36–40, Ottawa, Canada, May 1998.

Klein, Data Detection Algorithms Specifically Designed for the Downlink of CDMA Mobile Radio Systems, 1997 IEEE Vehicular Technology Conference, Phoenix, AZ, May 4–7, 1997.

Kohno et al., "Combination of an Adaptive Array Antenna and a Canceller of Interference for Direct –Sequence Spread–Spectrum Multiple–Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interference Suppression for Direct–Sequence Spread–Spectrum Communication," IEEE Trans. Commun., vol. 42, pp. 3178–3188, Dec. 1994.

Madkour et al., "Multi–Rate Multi–Code CDMA Using FWT For Mobile and Personal Communications," in Proceedings of The Ninth IEEE International Symposium on Personal, Indoor and Mobile Radio Communications, The Marriott Copley Place, Boston, Massachusetts, Sep. 8–11, 1998.

Mailaender et al., "Linear Single–User Detectors for Asynchronous and Quasi–Synchronous CDMA," in Proc. $29^{th}$ Annual Conf. on Info. Sciences and Systems (CISS '95), Johns Hopkins University, pp. 199–204, 1995.

Monk et al., "A Noise Whitening Approach to Multiple Access Noise Rejection–Part I: Theory and Background," IEEE Journal on Selected Areas in Communications, vol. 12, Jun. 1994, pp. 817–827.

Muszynski, P., "Interference Rejection Rake–Combining for WCDMA," First Intl. Symposium on Wireless Personal Multimedia Communications (WPMC '98), Yokosuka, Japan, pp. 93–98, Nov. 4–6, 1998.

Naguib et al., "Performance of CDMA Cellular Networks with Base–Station Antenna Arrays," Presented at the 1994 International Zurich Seminar on Digital Communications (no date).

Ng et al., "A Structured Channel Estimator for Maximum–likelihood Sequence Detection," IEEE Commun. Letters, vol. 1, pp. 52–55, Mar. 1997.

Ojanpera et al., "Qualitative Comparison of Some Multi–User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA System Using Correlations," in Proc. GLOBECOM, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct–Sequence–Spread–Spectrum Communication," IEEE Trans. Commun., vol. 44, pp. 1543–1552, Nov. 1996.

Peterson et al., "Introduction to Spread–Spectrum Communications," Prentice Hall International, Inc., pp. 540–547, 1995.

Picinbono, B., "On Circularity," IEEE Trans. Sig. Proc., vol. 42, pp. 3473–3482, Dec. 1994.

Picinbono, B., "Second–Order Complex Random Vectors and Normal Distributions," IEEE Trans. Sig. Proc., vol. 44, pp. 2637–2640, Oct. 1996.

Wang et al., "Blind Multi–User Detection: A Subspace Approach," IEEE Trans. Info. Theory, vol. 44, No. 2, pp. 677–690, Mar. 1998.

Yoon et al., "A Spread–Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS–CMDA," Sixth IEEE Intl. Symp. Personal, Indoor, Mobile Radio Commun. (PIMRC '95), Toronto, Sep. 27–29, 1995.

Yoon et al., "Matched Filters with Interference Suppression Capabilities for DS–CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub–Optimal Multi–User Detector for Frequency Selective Rayleigh Fading Synchronous CDMA Channels," IEEE Trans. Commun., vol. 43, No. 2/3/4, pp. 154–157, Feb./Mar./Apr. 1995.

International Search Report, PCT/US00/22504, Nov. 30, 2000.

* cited by examiner

METHODS AND APPARATUS FOR INTERFERENCE CANCELLATION USING COMPLEX INTERFERENCE ORTHOGONALIZATION TECHNIQUES

FIELD OF THE INVENTION

The present invention relates to communications systems and methods, and more particularly, to communications receivers and methods of operation thereof.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems, such as those conforming to the North American standard IS-54 and the European standard GSM, have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook,* edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more control channels and one or more traffic channels. A control channel is a channel used for transmitting cell identification, paging and other control information. Traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication for a cell 24. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity.

Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading sequence, i.e., a sequence that spreads an original data-modulated carrier over a wide portion of the frequency spectrum in which the communications system operates.

Conventional spread-spectrum CDMA communications systems commonly use "direct sequence" (DS) spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

In a typical CDMA system, a data stream intended for a particular user (terminal) is first direct-sequence spread according to a user-specific spreading sequence, and the resultant signal is then scrambled according to a cell-specific scrambling sequence. The spread and scrambled user data stream is then transmitted in a communications medium. Spread-spectrum signals for multiple users generally combine to form a composite signal in the communications medium.

In a typical coherent DS spread spectrum receiver, a received composite signal is despread by correlating it with a spreading sequence. The despread value is weighted by the conjugate of a channel coefficient estimate, which generally removes the phase rotation and produces a soft (confidence) value that can be used to generate an estimate of the originally transmitted symbol. When multipath propagation is present, the amplitude can vary dramatically, however. Multipath propagation can also lead to time dispersion, which can cause multiple, resolvable echoes ("rays") of the original transmitted signal to be received at the receiver. To deal with multipath propagation effects, a typical RAKE receiver includes respective correlators time-aligned with respective ones of the echoes, generating respective despread values for each echo. The despread values are typically combined in a weighted fashion ("RAKE combined").

Receiver performance in DS-CDMA systems is generally limited by interference among signals. Because individual channels in a DS-CDMA are typically transmitted using orthogonal spreading codes and random scrambling sequences, descrambling and despreading operations at a receiver provide a degree of interference suppression. However, dispersion and other effects may reduce the separation between signals, leading to interference among the channels. This interference may affect signal quality, which may reduce overall system capacity.

Traditional RAKE receivers typically treat interference as noise. Consequently, when interference is high, the performance of such receivers may be significantly degraded. Accordingly, interference cancellation techniques have been proposed, including multiuser interference cancellation techniques such as joint demodulation, decorrelation and successive cancellation. Unfortunately, these techniques can be highly complex and power consuming, characteristics which may be disadvantageous in power limited devices such as battery operated mobile cellular telephones.

A few single-user interference cancellation techniques have also been proposed. One approach employs adaptive despreading using a minimum mean square error (MMSE) criterion. According to such an approach, a desired signal is effectively projected away from an N-dimensional space formed by spreading sequences used by interfering other users. Another interference-cancellation technique has been proposed in U.S. Pat. No. 5,572,552 to Dent et al. This technique can be effective at canceling interference when the communications medium is dispersive, i.e., when the receiver receives a large number of echoes. However, this technique may be less effective when the medium is not highly dispersive.

SUMMARY OF THE INVENTION

In light of the foregoing, it is an object of the present invention to provide communications apparatus and methods that can provide effective interference cancellation in CDMA communications systems.

It is another object of the present invention to provide communications apparatus and methods that can provide effective interference cancellation in systems using scrambling sequences.

It is yet another object of the present invention to provide communications apparatus and methods that can provide effective interference cancellation without undue complexity and/or power consumption.

These and other objects, features and advantages may be achieved, according to the present invention, by communications apparatus and methods in which a communications signal that includes components of both a desired signal and an interfering signal, is correlated with both the desired signal's modulation sequence and with a combination of the desired signal's modulation sequence and a complex component of the interfering signal's modulation sequence, for example, the interfering signal's complex scrambling sequence, to produce respective first and second correlation outputs. The first and second correlation outputs are then combined, preferably in a weighted fashion that trades off interference cancellation and suppression of interference from signals modulated orthogonally to the desired signal, to generate an estimate of information represented by the desired signal.

In preferred wireless CDMA cellular embodiments of the present invention, knowledge of the desired signal's scrambling sequence and spreading sequence, along with knowledge of an interferer's complex scrambling sequence, can be used to achieve effective interference cancellation. Because the desired signal's modulation structure is typically known and knowledge of interferer scrambling sequences can typically be straightforwardly obtained, the present invention can provide effective interference cancellation without undue complexity or cost. According to other aspects of the invention, interference cancellation can be traded off against other performance criteria, such as providing reduced interference from orthogonal-code signals transmitted from the same base station as the desired signal.

In particular, according to an embodiment of the present invention, a communications signal including components associated with first and second signals that are modulated according to respective first and second modulation sequences is processed to generate a baseband signal. The baseband signal is correlated with the first modulation sequence to produce a first correlation output. The baseband signal is also correlated with a combination of the first modulation sequence and a complex component of the second modulation sequence to generate a second correlation output. The first and second correlation outputs are combined to generate an estimate of information represented by the first signal, for example, by combining the first and second correlation outputs to produce a first RAKE finger output and combining the first RAKE finger output with a second RAKE finger output to generate an estimate of information represented by the first signal.

According to one preferred embodiment of the present invention, the first signal is modulated according to a combination of a first scrambling sequence and a first spreading sequence, and the second signal is modulated according a combination of a second scrambling sequence and a second spreading sequence. The step of correlating the baseband signal with the first modulation sequence includes the steps of descrambling the baseband signal with a complex conjugate of the first scrambling sequence to generate a first plurality of descrambled values, and correlating the first plurality of descrambled values with the first spreading sequence to generate the first correlation output. The step of correlating the baseband signal with a combination of the first modulation sequence and a complex component of the second modulation sequence includes the steps of descrambling the baseband signal with the first scrambling sequence to generate a second plurality of descrambled values, and correlating the second plurality of descrambled values with a product of the first spreading sequence, an in-phase component of the second scrambling sequence and a quadrature component of the second scrambling sequence to generate the second correlation output.

According to a zero-forcing solution aspect of the present invention, the first and second correlation outputs are combined according to channel estimates for the first and second signals. In a combined zero-forcing/conventional approach, the noise power and interference power are estimated for the first and second signals, respectively, and used, along with the channel estimates, to weightedly combine the first and second correlation outputs. Weighting factors for combining the first and second correlation outputs may also be determined using adaptive techniques, for example, by determining the weighting factors from known information, such as pilot channel or pilot symbol values, or from estimated information, such as decoded symbols having a high level of confidence.

According to other aspects of the present invention, the communications signal includes a component associated with a third signal that is modulated according to a combination of the first scrambling sequence and a third spreading sequence that is orthogonal to the first spreading sequence. According to a "balanced rotation" aspect, the step of combining the first and second correlation outputs is preceded by the step of determining a minimum rotation angle that minimizes interference associated with the third signal. The first and second correlation outputs are combined according to the determined minimum rotation angle to reduce interference arising from the third signal. According to an "equalization" aspect, the step of combining the first and second correlation outputs is preceded by the step of equalizing the first and second correlation outputs to control interference associated with the third signal. The equalized first and second correlation values are then combined to produce an estimate of information represented by the first signal.

According to another embodiment of the present invention, equalization may be advantageously implemented by multiplying the first plurality of descrambled values, produced by descrambling the baseband signal with the conjugate of the first scrambling sequence, by the first spreading sequence to generate scaled descrambled values. The scaled descrambled values are then sorted into first and second sets based on corresponding values of an indicator function comprising a product of in-phase and quadrature components of the first and second scrambling sequences. Respective ones of the first and second sets of scaled descrambled values are then accumulated to generate respective first and second sets of partial correlation output values. Similarly, the second plurality of descrambled values, produced by descrambling the baseband signal with the first scrambling sequence, are multiplied by a product of the first spreading sequence, an in-phase component of the second scrambling sequence and a quadrature component of the second scrambling sequence to generate scaled descrambled values. The scaled descrambled values are sorted into third and fourth sets based on corresponding values of the indicator function, and respective ones of the third and fourth sets of scaled descrambled values are accumulated to generate respective third and fourth sets of partial correlation output values. The first, second, third and fourth sets of partial correlation output values are then combined to generate a finger output.

According to another aspect of the present invention, a receiver for processing a communications signal that includes components associated with first and second signals that are modulated according to respective first and second modulation sequences includes a converter operative to produce a baseband signal from the communications signal. A complex interference orthogonalizing baseband processor is responsive to the converter and operative to correlate the baseband signal with the first modulation sequence to produce a first correlation output, to correlate the baseband signal with a combination of the first modulation sequence and a complex component of the second modulation sequence to generate a second correlation output, and to combine the first and second correlation outputs to generate an estimate of information represented by the first signal.

According to yet another embodiment of the present invention, the complex interference orthogonalizing baseband processor includes a first correlator operative to correlate the baseband signal with the first modulation sequence to produce a first correlation output. A second correlator is operative to correlate the baseband signal with a combination of the first modulation sequence and a complex component of the second modulation sequence to generate a second correlation output. A combiner is responsive to the first and second correlators and operative to combine the first and second correlation outputs to generate an estimate of information represented by the first signal.

According to another embodiment of the present invention, the first signal is modulated according to a combination of a first scrambling sequence and a first spreading sequence, and the second signal is modulated according to a combination of a second scrambling sequence and a second spreading sequence. The first correlator includes a first descrambler operative to descramble the baseband signal with a complex conjugate of the first scrambling sequence to generate a first plurality of descrambled values, and a first despreader operative to correlate the first plurality of descrambled values with the first spreading sequence to generate the first correlation output. The second correlator includes a second descrambler operative to descramble the baseband signal with the first scrambling sequence to generate a second plurality of descrambled values, and a second despreader operative to correlate the second plurality of descrambled values with a product of the first spreading sequence, an in-phase component of the second scrambling sequence and a quadrature component of the second scrambling sequence to generate the second correlation output.

Improved receiver methods and apparatus that can achieve interference cancellation without undue complexity may thereby be provided.

DETAILED DESCRIPTION OF PREFERRED EMBODIMENTS

Figure 1:
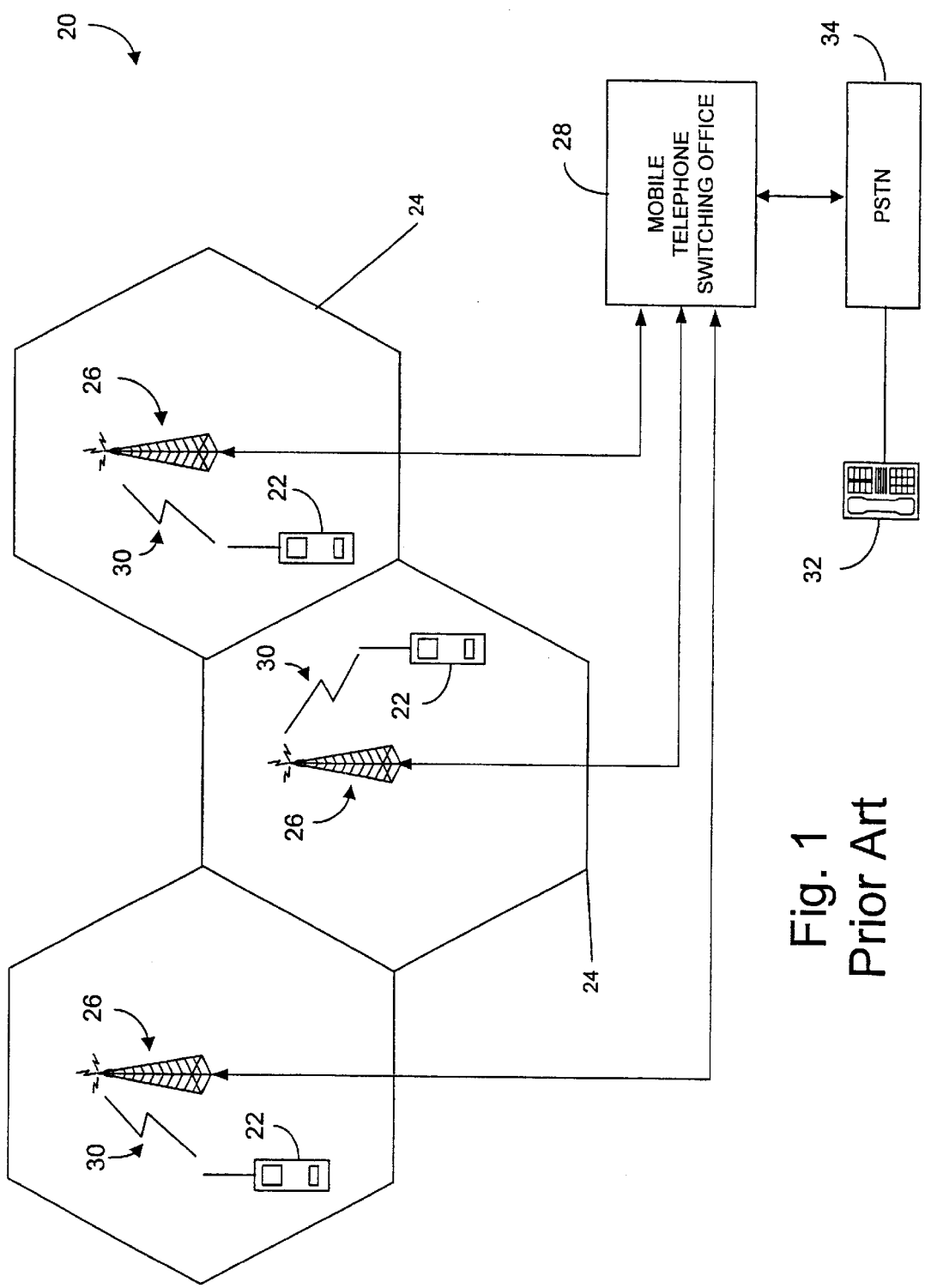
FIG. 1 is a schematic diagram illustrating a terrestrial wireless communications system according to the prior art.
Figure 2:
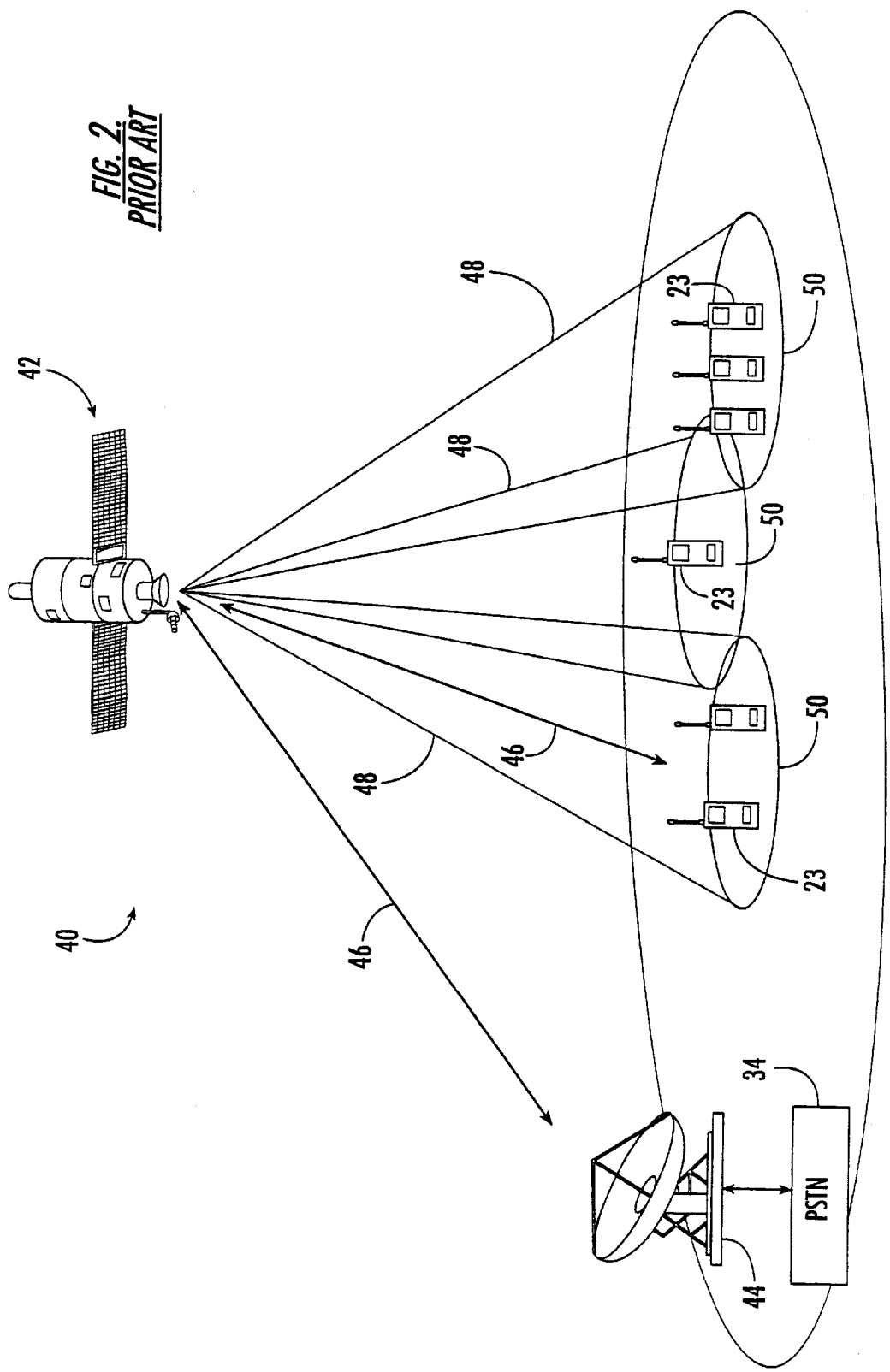
FIG. 2 is a schematic diagram illustrating a satellite wireless communications system according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Embodiments of the present invention described herein refer to a link such as a forward link conforming to the IS-95 standard. It will be appreciated by those skilled in the art, however, that the present invention is applicable to any of a number of types of communications links in any of a number of different communications systems. For example, the present invention may be employed in 3rd generation systems such as Wideband CDMA (WCDMA) systems. It will also be appreciated that, although the present invention may be used advantageously in a terminal for use in a code division multiple access (CDMA) wireless communications system, the present invention may also be used in any of a number of different types of communications receivers, including, but not limited to wireless, wireline, and fiber optic receivers.

In a typical conventional IS-95 forward link, information bits destined for transmission to a terminal are first spread according to a Walsh spreading sequence (code), i.e., each bit is spread using one of 64 orthogonal, real Walsh code words. The resulting Walsh chips are then scrambled according to a complex scrambling sequence, producing scrambled chips. The scrambling operation can be viewed as multiplying a modulated Walsh chip, having a value of +1 or −1, by a complex scrambling chip, having a value of 1+j, −1+j, −1−j, or 1−j, to produce a scrambled chip having a value of 1+j, −1+j, −1−j or 1−j. The scrambled chip is then pulse shaped and transmitted. The complex scrambling code can be viewed as effectively distributing a spread signal uniformly in the complex plane. This may imply that nonuniformity cannot be exploited for interference cancellation purposes.

The present invention arises from the realization that, if the complex scrambling sequence used to transmit such an interfering signal is known, then for a given chip, the remaining unknown portion of the interfering signal, e.g., the Walsh chip values and binary phase shift keyed (BPSK) channel bits, are real. Thus, once the uniformity introduced by the scrambling sequence is removed, interference may be rendered nonuniform in the complex plane, even though its orientation may change from chip to chip. This nonuniformity can then be advantageously used for interference cancellation.

Figure 3:
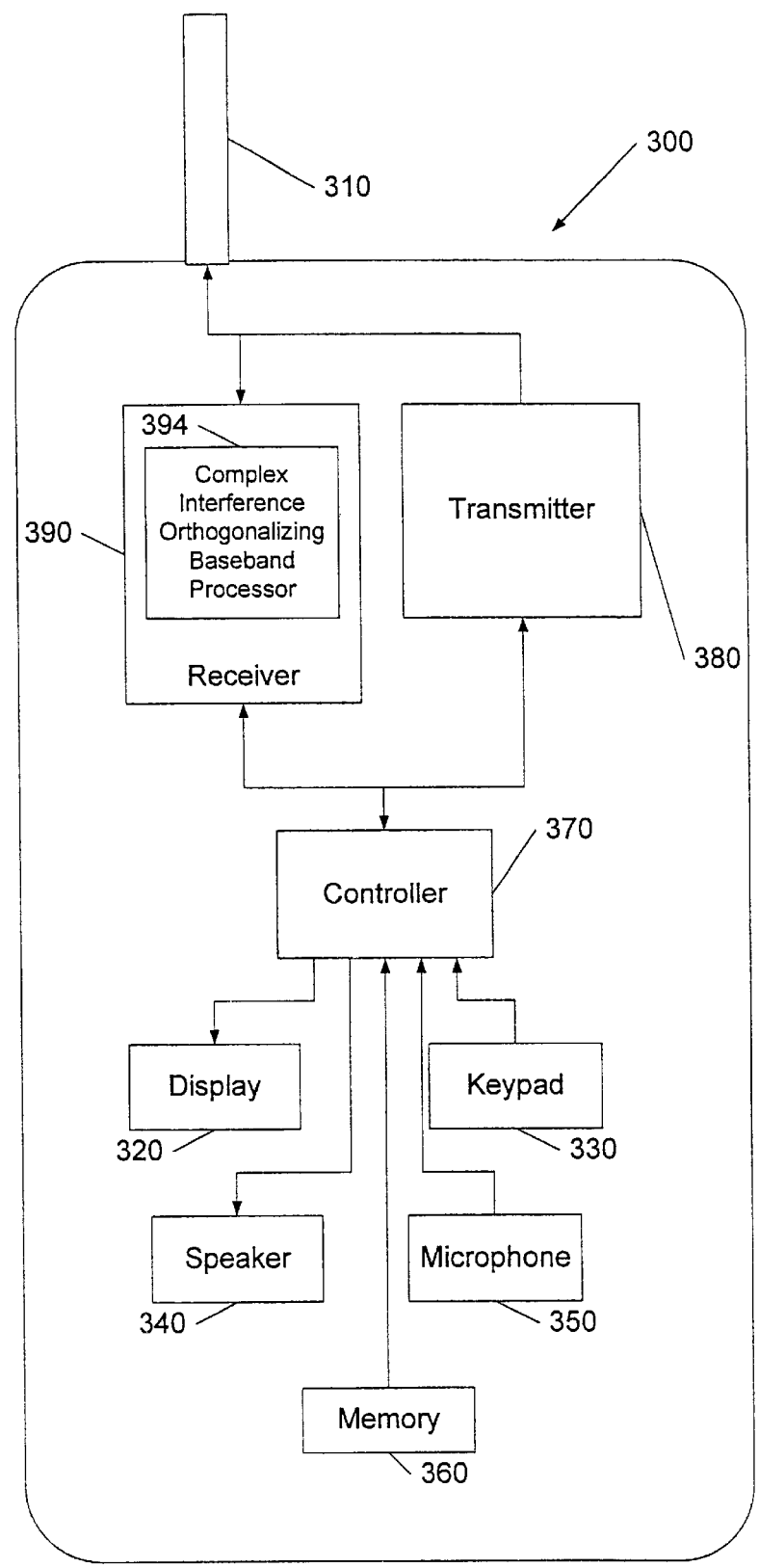
FIG. 3 is a schematic diagram of a wireless terminal according to an embodiment of the present invention.

FIG. 3 illustrates an exemplary wireless terminal 300, e.g., a terminal for use in a wireless CDMA communications system, in which the present invention may be embodied. The terminal 300 includes a controller 370, such as a microprocessor, microcontroller or similar data processing device, that executes program instructions stored in a memory 360, such as a dynamic random access memory (DRAM), electrically erasable programmable read only memory (EEPROM) or other storage device. The controller 370 is operatively associated with user interface components such as a display 320, keypad 330, speaker 340, and microphone 350, operations of which are known to those of skill in the art and will not be further discussed herein. The controller 370 also controls and/or monitors operations of a radio transmitter 380 that, for example, transmits radio frequency (RF) signals in a communications medium via an antenna 310.

The controller 370 is also operatively associated with a receiver 390. The receiver 390 include a complex interference orthogonalizing baseband processor 394 that processes a baseband signal produced from a communications signal received by the antenna 310. The complex interference orthogonalizing baseband processor 394 is operative, for example, in a finger of a RAKE structure, to correlate the baseband signal with a modulation sequence, such as a combination of a scrambling sequence and a spreading sequence, associated with a desired signal, to produce a first correlation output. The complex interference orthogonalizing baseband processor 394 is also operative to correlate the baseband signal with a combination of the desired signal's modulation sequence and a complex component (e.g., a scrambling sequence) of a modulation sequence associated with an interfering signal to generate a second correlation output. The baseband processor 394 combines the first and second correlation outputs to generate an estimate of information represented by the desired signal. Detailed discussion of exemplary operations for such a baseband processor is provided below.

It will be appreciated that the receiver 390 and other components of the terminal 300 may be implemented using a variety of hardware and software. For example, portions of the receiver 390, including the complex interference orthogonalizing baseband processor 394, may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the receiver 390 may be integrated in a single device, such as a single ASIC, they may also be distributed among several devices.

An illustrative example of interference cancellation according to embodiments of the present invention is provided by considering a single ray of a desired signal received in the presence of a single, chip-aligned interfering ray. Assuming that the receiver front end is matched to the chip pulse shape, that the pulse shape is Nyquist, perfect timing and one baseband sample per chip, a received baseband signal sequence during one symbol period may be expressed as:

$$r(k)=cbw(k)p(k)+dv(k)q(k)+n(k). \qquad (1)$$

In equation (1), c is the desired signal ray's complex channel coefficient, b is the desired signal's information symbol (±1), w(k) is the desired signal's Walsh sequence (code), and p(k) is the desired signal's complex scrambling sequence. Similarly, d is the interfering signal ray's complex channel coefficient, q(k) is the interfering signal ray's complex scrambling sequence, and v(k) is a real sequence of ±A(k) values that models the underlying Walsh spreading and BPSK modulation of one or more user signals in the interfering ray. The scrambling sequence p(k) can be expressed as $p(k)=p_1(k)+jp_Q k$, where $p_1(k)$ is a real zero-extended pseudorandom sequence of ±1 values, $p_Q(k)$ is another real zero-extended pseudorandom sequence of ±1 values, and j indicates a quadrature component. Similarly, the scrambling sequence q(k) can be expressed as $q(k)=q_1(k)+jq_Q k$, where $q_1(k)$ is a real zero-extended pseudorandom sequence of ±1 values, $q_Q(k)$ is another real zero-extended pseudorandom sequence of ±1 values, and j indicates a quadrature component. Finally, n(k) is a noise sequence modeling other interference and thermal noise.

In a conventional RAKE receiver, it is typically assumed that the desired signal ray's complex channel coefficient c, the desired signal's complex scrambling sequence p(k), and the desired signal's Walsh sequence w(k) are known or estimated. For example, the channel coefficient c and scrambling sequence p(k) may be estimated by reception of a pilot channel using techniques known to those skilled in the art. The Walsh sequence w(k) may be communicated to the receiver during call setup, or may be otherwise known.

The output of a finger of a conventional RAKE receiver for a baseband signal r(k) may be expressed as Re{c*x}, where:

$$x = \sum_{k=1}^{64} w(k)[p^*(k)r(k)], \quad (2)$$

is a despread value produced by correlation with the spreading and scrambling sequences w(k) and p(k). The baseband signal samples r(k) are descrambled by multiplying them by the complex conjugate of the scrambling sequence p(k), and then despread by multiplying the descrambled values by the Walsh spreading sequence w(k) and accumulating the results over 64 chip periods to produce the despread values x(k). The despread values x(k) are then weighted by the complex conjugate of the channel coefficient c, keeping only the real parts. This effectively results in a weighted combination of the real and imaginary parts of the despread value x:

$$Re\{c^*x\} = c_I x_I + c_Q x_Q, \quad (3)$$

where $c_I$ is the real part or in-phase component of the channel coefficient c, $c_Q$ is the imaginary part or quadrature component of the channel coefficient c, $x_I$ is the real part or in-phase component of the despread value x, and $x_Q$ is the imaginary part or quadrature component of the despread value x.

According to aspects of the present invention, information about the interfering signal is used along with information about the desired signal to generate estimates of information represented by the desired signal. The "known" (i.e., actually known or estimated) information about the interfering signal preferably includes the channel coefficient d for the ray of the interfering signal, which may be estimated, for example, by despreading a pilot channel associated with the interfering signal and performing channel estimation based on the despread output. The known information about the interfering signal also preferably includes the scrambling sequence q(k) used to transmit the interfering signal, which also may be obtained using conventional pilot channel despreading techniques.

Both of these pieces of information can be obtained in relatively straightforward ways. If the interfering signal is a ray from the desired signal's base station, then the channel coefficient d for the interfering ray may be already computed for another finger of the receiver. If the interfering ray is from a different base station, a channel coefficient may likewise be available from a finger of the receiver if, for example, the receiver is in a soft handover mode wherein it is receiving signals from multiple base stations. Otherwise, additional apparatus may be provided to despread the pilot channel associated with the interfering ray and perform channel estimation therefrom. Such apparatus are known to those skilled in the art.

If the interfering ray is from the same base station as the desired signal, the interfering ray's scrambling sequence q(k) may be known from the receiver's synchronization and delay estimation with respect to that base station. If the interfering ray is from a base station in the "active set," for example, a set of base stations with which the receiver is in soft-handover mode, then such synchronization information may also be available. The scrambling sequence may also have been identified when making measurements for other base stations, and timing information from those measurements may indicate the interfering ray's scrambling sequence q(k).

In practice, there may be several possible interfering sources, including rays from the base station transmitting the desired signal, as well as rays from other base stations. Another interfering source is users employing nonorthogonal or quasi-orthogonal spreading sequences in the same cell. According to one aspect of the present invention, interference cancellation is applied to the strongest interfering source, which can be identified in an adaptive manner. For example, for first and second rays transmitted from the same base station as a desired signal, and a third ray from another base station, interference arising from either the second and third ray can be canceled when processing the first ray depending on which of the second and third rays is strongest. Similarly, when processing the second ray, interference arising from the first or third rays can be canceled based on their relative strengths. In order to determine relative strengths, power of the product d*v(k) may be determined for each candidate interfering signal, which can be achieved by measuring power in the fading coefficient d and power in the transmitted interfering signals v(k). As each interfering signal varies in power, the receiver can adaptively select which interfering signal to cancel. Selection can also be made invariant to the fading, by selecting on the basis of the power in the v(k) alone.

Although identifying the strongest interferer may be an advantageously straightforward way of selecting which interferer to cancel, it is preferable that the interferer to be canceled is selected such that signal-to-interference-plus noise ratio (SINR) of the finger output is maximized. Thus, it is preferable that, in addition to the power measurements described above, a metric corresponding to SINR is also determined for each candidate interferer. It is noted that SINR generally depends not only on the interferer's strength, but also on its angle in the complex plane with respect to the desired signal. If angular separation between a strongest interferer and the desired signal is small, it generally is more difficult to effectively project the desired signal away from the interferer. Consequently, the most effective interference cancellation may not always lie in canceling the strongest interferer.

In some applications, it may be unnecessary to determine power for each of the v(k). One such application is in systems using transmit delay diversity for cells with low dispersion, e.g., in indoor cells. In such systems, a base station purposely transmits echoes of a desired signal which, for purposes of the present invention, preferably are timed an integer number of chips apart. In such an application, relative signal strengths of the different rays depend mostly on the channel coefficients d, which may fold in power weighting of the images at the transmitter. Consequently, power in each of the v(k) need not be determined, as determination of the strongest interferer may be made based on the channel coefficients d. When using transmit delay diversity in multiple cells, it may be preferable to time echoes a noninteger number of chips apart.

Accordingly to another aspect of the present invention, interference cancellation can be advantageously used in conjunction with power control mechanisms to increase system capacity. Many CDMA systems utilize power control algorithms that adjust transmit power per user based on signal quality measurements for that user. If a user uses interference cancellation in its receiver, the system can reduce the transmit power to the user, which can free more capacity for use by other users. If the interference-canceling user is already at a minimum transmit power, the user can enjoy the benefit of reduced error rate.

The present invention may be viewed as using the above-described limited information about an interfering signal to project (orthogonalize) a desired signal away from an interfering signal in the complex (I/Q) plane. Although signal orientation can change over successive chips, there should effectively be only two possible signal orientations for any given chip. Consequently, the "complex interference orthogonalization" described herein can be viewed as choosing between a limited number of possible solutions to a "zero-forcing" problem.

Figure 4:
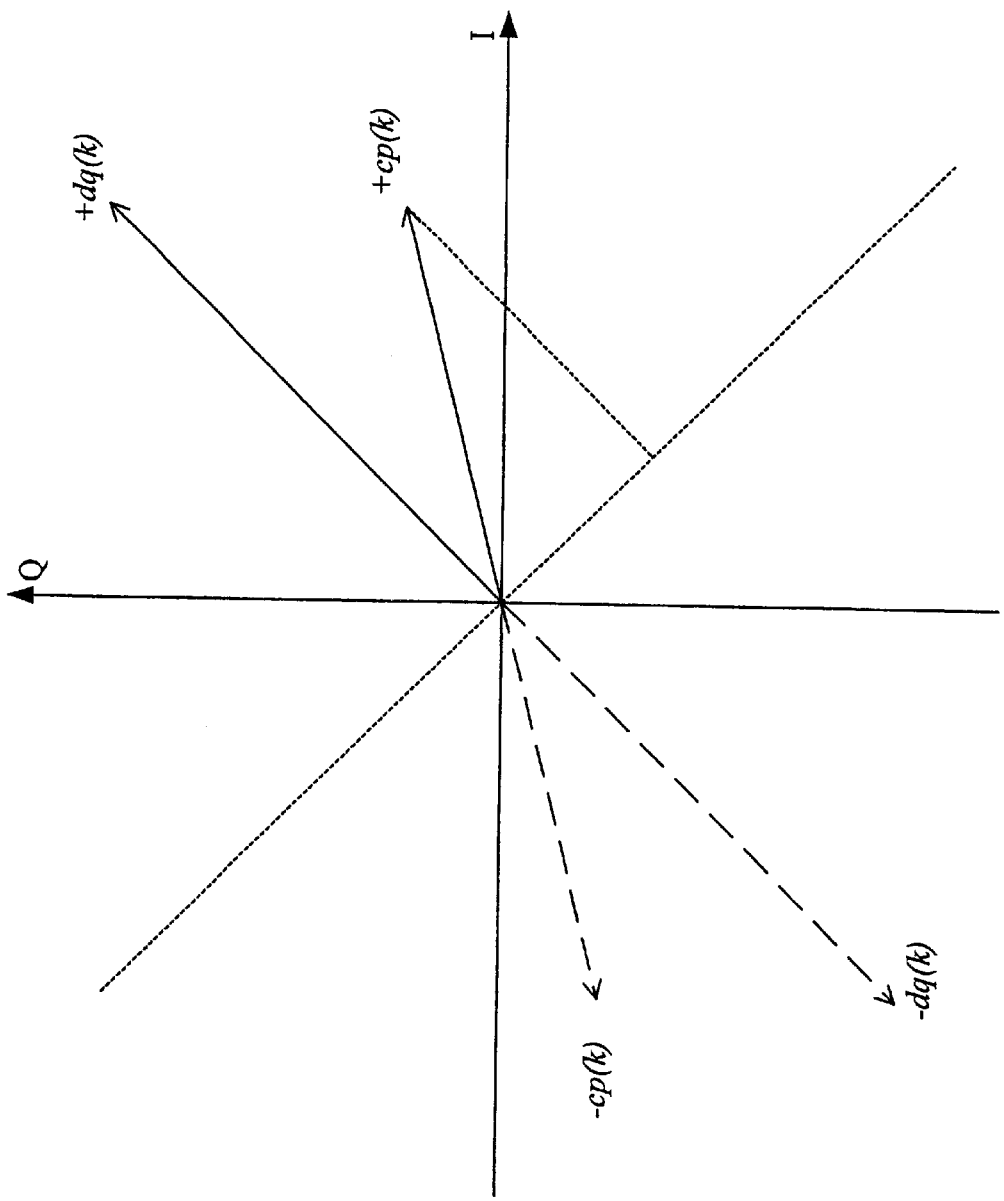
FIG. 4 is a graph illustrating signal projection in a complex signal plane according to an aspect of the present invention.

Referring to FIG. 4, the complex (I/Q) plane is defined by orthogonal in-phase and quadrature axes I, Q. During a chip period k, a desired signal can be represented as a vector having an angle relative to the in-phase axis I that depends on the channel coefficient c and the complex scrambling sequence value p(k). As the bit value is ±1, the desired signal is either +cp(k) or −cp(k), and thus lies upon a line defined by the vectors +cp(k) or −cp(k). The unknown part v(k) of the interference that models the channel bit values and Walsh chips of one or more users, has some value ±A(k) that is purely real. Thus, the interfering signal can be represented as being aligned with vectors +dq(k) and −dq(k).

To cancel the interfering signal, which may be referred to as generating a zero-forcing (ZF) solution, the finger output $F_{ZF}$ for a receiver according to embodiments of the present invention may be given by:

$$F_{ZF}=Re\{|d|^2c^*x+(-jddc^*)^*y\}, \quad (4)$$

where $$y = \sum_{k=1}^{64} w(k)q_1(k)q_Q(k)p(k)r(k), \quad (5)$$

denotes a "multisignal despread value". The finger output $F_{ZF}$ may be weightedly combined with other similarly generated finger outputs to generate a soft value for use in symbol estimation.

The multisignal despread value y differs from a conventional despread value x in several respects. The multisignal despread value y is generated by multiplying the complex sample r(k) by the scrambling sequence value p(k) instead of the conjugate of the scrambling sequence value. In addition, the value thus produced is despread using a product of the Walsh sequence w(k) for the desired signal, the in-phase component $q_1(k)$ of the interfering signal's scrambling sequence, and the quadrature component $q_Q(k)$ of the interfering signal's scrambling sequence, rather than the Walsh sequence w(k) alone. Thus, despreading includes a "product scrambling sequence" $q_P(k)=q_1(k)^*q_Q(k)$ of the interfering signal. The multisignal despread value y is weighted by a weight that depends on channel coefficients for both the desired and interfering signals, and then added to a weighted version of a conventional despread value x. For BPSK modulation, only the real part of the sum need be computed.

When a received signal includes a significant amount of interference, the complex orthogonal projection technique described above can work well. In situations in which noise is stronger, however, a conventional RAKE solution may be preferable. Thus, it is preferable to use a combination of the complex projection approach and a conventional RAKE approach. A finger output $F_{combined}$ for such a combination may be expressed as:

$$F_{combined} = \left(\frac{N}{N^2 + 2NI|d|^2}\right)Re\{c^*x\} + \quad (6)$$

$$\left(\frac{I}{N^2 + 2NI|d|^2}\right)Re\{|d|^2c^*x+(-jddc^*)^*y\}$$

$$= K_N Re\{c^*x\} + K_I Re\{|d|^2c^*x+(-jddc^*)^*y\}$$

where N is the noise power for the in-phase and quadrature components and I is the interference power in v(k). The finger output $F_{combined}$ may be expressed as a weighted combination of a conventional despread value x and the multisignal despread value y:

$$F_{combined}=Re\{f_x^*x+f_y^*y\}, \quad (7)$$

where the combining weights $f_x^*$, $f_y^*$ may be chosen to optimize performance.

The noise power N and the interference power I may be estimated in a number of different ways. For example, the noise power N may be indicated by automatic gain control (AGC), which is typically dominated by power in the noise sequence n(k). AGC typically scales the received signal such that its power meets a target value $P_T$, such that the noise power after AGC (but before baseband processing) is P. The interference power I can be estimated by despreading using the set of possible sequences present in the interfering signal term, determining which sequences of the set are present, estimating power in the active sequences, and accounting for biases due to other noise and the desired signal. U.S. patent application Ser. No. 09/235,470 to Wang et al., filed Jan. 22, 1999, describes exemplary techniques for such power estimation.

Figure 5:
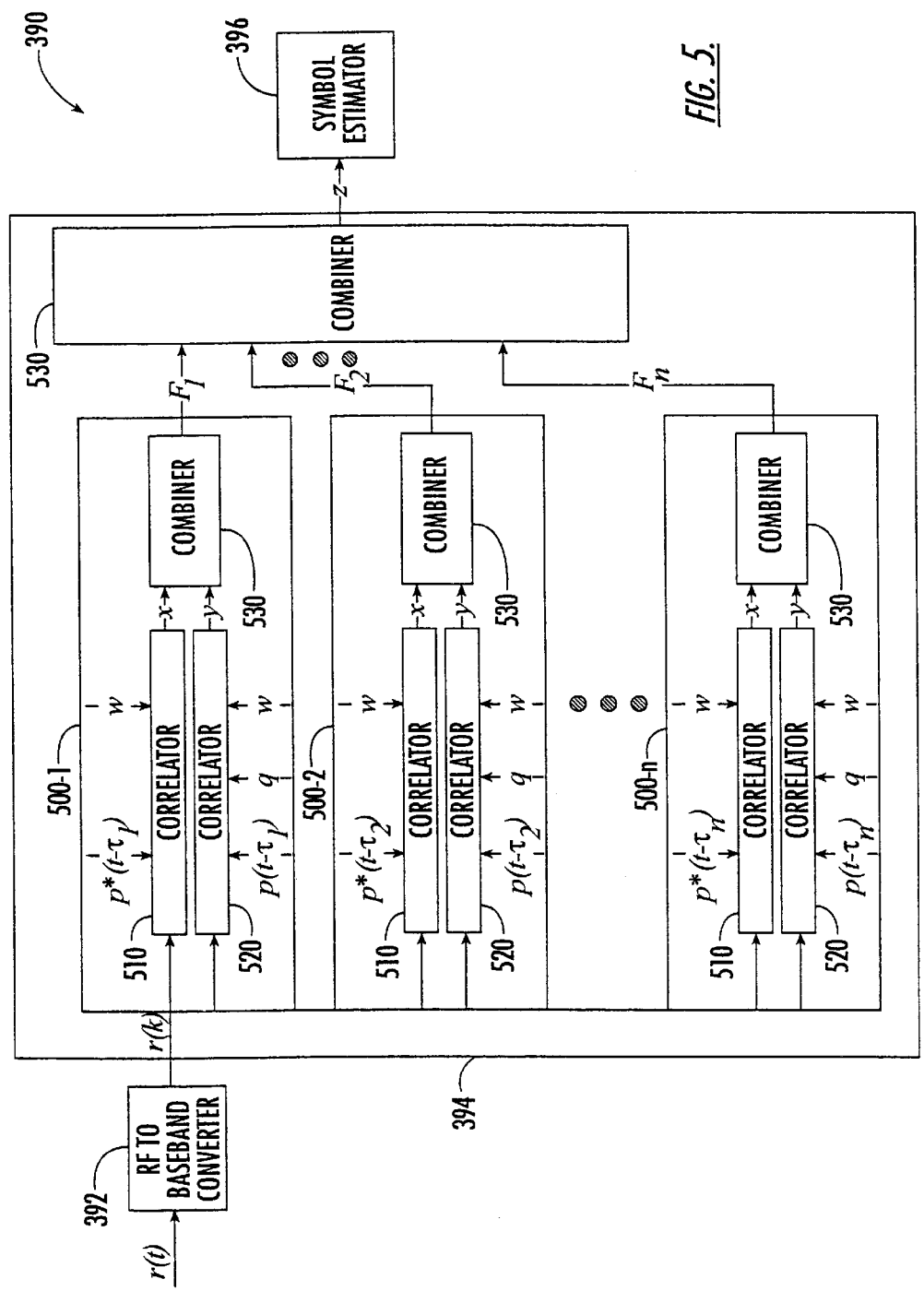
FIG. 5 is a schematic diagram illustrating a communications receiver according to an embodiment of the present invention.

FIG. 5 illustrates a receiver 390 according to an embodiment of the present invention. The receiver 390 includes an RF-to-baseband converter 392 that produces a baseband signal r(k) from a received communications signal r(t). A complex interference orthogonalizing baseband processor 394 is responsive to the RF-to-baseband converter 392 and includes a plurality of fingers 500-1, 500-2, ..., 500-n that produce finger outputs $F_1$, $F_2$, ..., $F_n$ from the baseband signal r(k). A combiner 530 combines the finger outputs $F_1$, $F_2$, ..., $F_n$ to produce a decision statistic Z using, for example, RAKE combining techniques that are known to those skilled in the art. The decision statistic Z may be used to estimate information represented by a desired signal, for example, in a symbol estimator 396.

The fingers 500-1, 500-2, ..., 500-n include first correlators 510 that correlate the baseband signal r(k) with combinations of time-offset complex conjugates $p^*(t-\tau_1)$, $p^*(t-\tau_2)$, ..., $p^*(t-\tau_n)$ of a desired signal's scrambling sequence and the desired signal's spreading sequence w. The fingers 500-1, 500-2, ..., 500-n also include second correlators 520 that correlate the baseband signal r(k) with combinations of time-offset versions $p(t-\tau_1)$, $p(t-\tau_2)$, ..., $p(t-\tau_n)$ of a desired signal's scrambling sequence, the desired signal's spreading sequence w, and an interfering signal's product scrambling sequence $q_P=q_1^*q_Q$. First and second correlation outputs x, y produced by the first and second correlators 510, 520 are combined in combiners 530 to produce the finger outputs $F_1$, $F_2$, ..., $F_n$.

The symbol estimator 396 may perform a variety of operations. For example, it may perform convolutional decoding to recover symbols that were convolutionally encoded at the transmitting station. For uncoded information, such as power control bits, the symbol estimator 396 may simply examine the sign of its input to determine these bit values.

Figure 6:
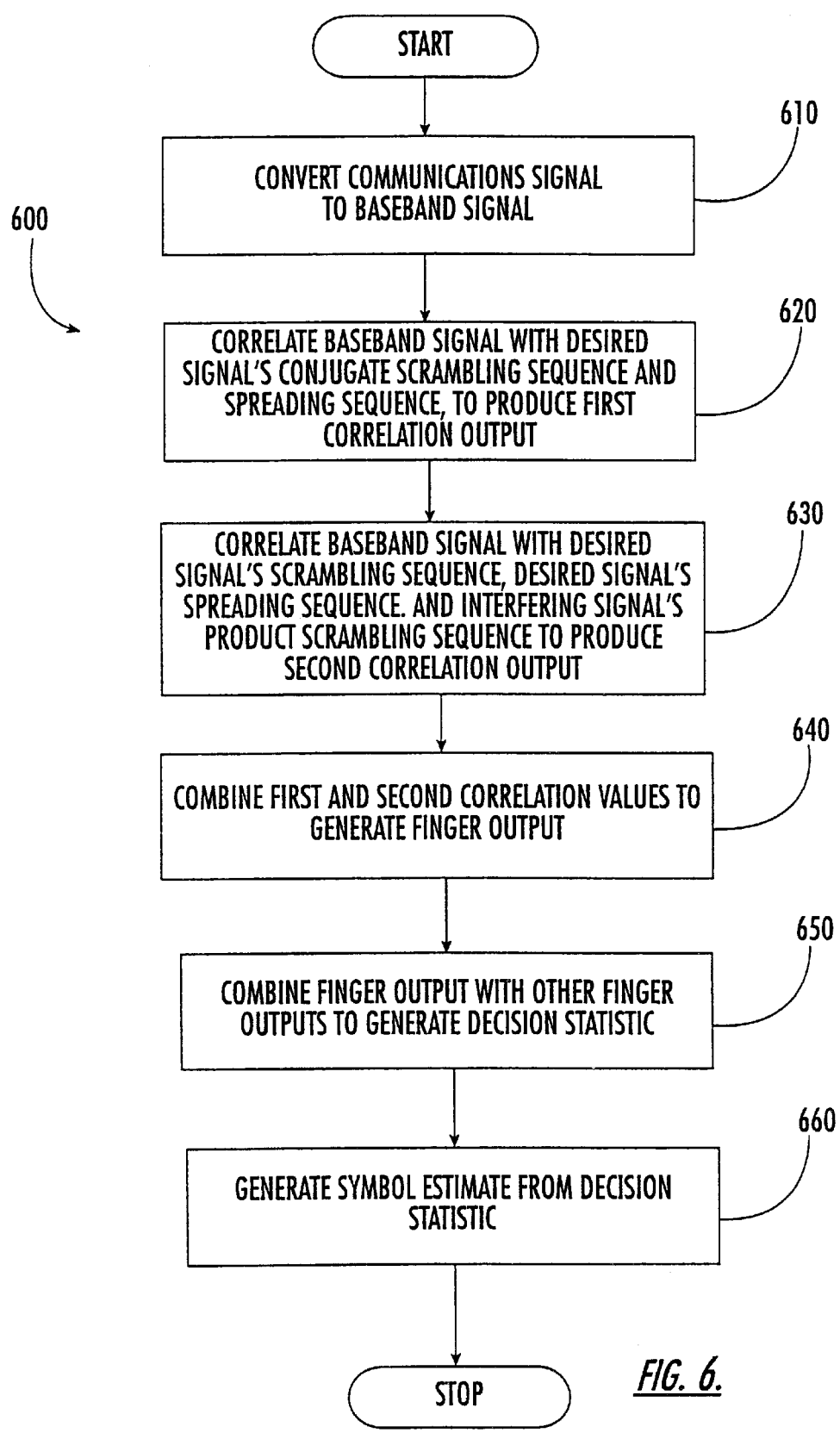
FIG. 6 is a flowchart illustrating exemplary operations for interference cancellation according to an embodiment of the present invention.

FIG. 6 illustrates exemplary operations 600 for the receiver 390 of FIG. 5. A communications signal is converted into a baseband signal (Block 610). The baseband signal is correlated with a combination of a complex conjugate of a desired signal's scrambling sequence and its spreading sequence to produce a first correlation output (Block 620). The baseband signal is also correlated with a combination of the desired signal's scrambling sequence, the desired signal's spreading sequence, and an interfering signal's product scrambling sequence to produce a second correlation output (Block 630). The first and second correlation outputs are combined to produce a finger output (Block 640), which is combined with other finger outputs to produce a decision statistic (Block 650). The decision statistic is then used to generate a symbol estimate for a symbol represented by the desired signal (Block 660).

It will be appreciated that blocks and combinations of blocks of the flowchart of FIG. 6 can be implemented by computer program instructions which may be loaded and executed on a computer or other programmable apparatus, such as a microcontroller, microprocessor, ASIC, DSP or other processing circuit used to implement apparatus, such as the receiver apparatus described herein with reference to FIGS. 3, 5 and 7–9, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart of FIG. 6 support combinations of means for performing the specified functions and combinations of steps for performing the specified functions. It will also be understood that each block of the flowchart of FIG. 6, and combinations of blocks therein, can be implemented by special purpose hardware-based computer systems which perform the specified functions or steps, or combinations of special purpose hardware and computer instructions.

Figure 7:
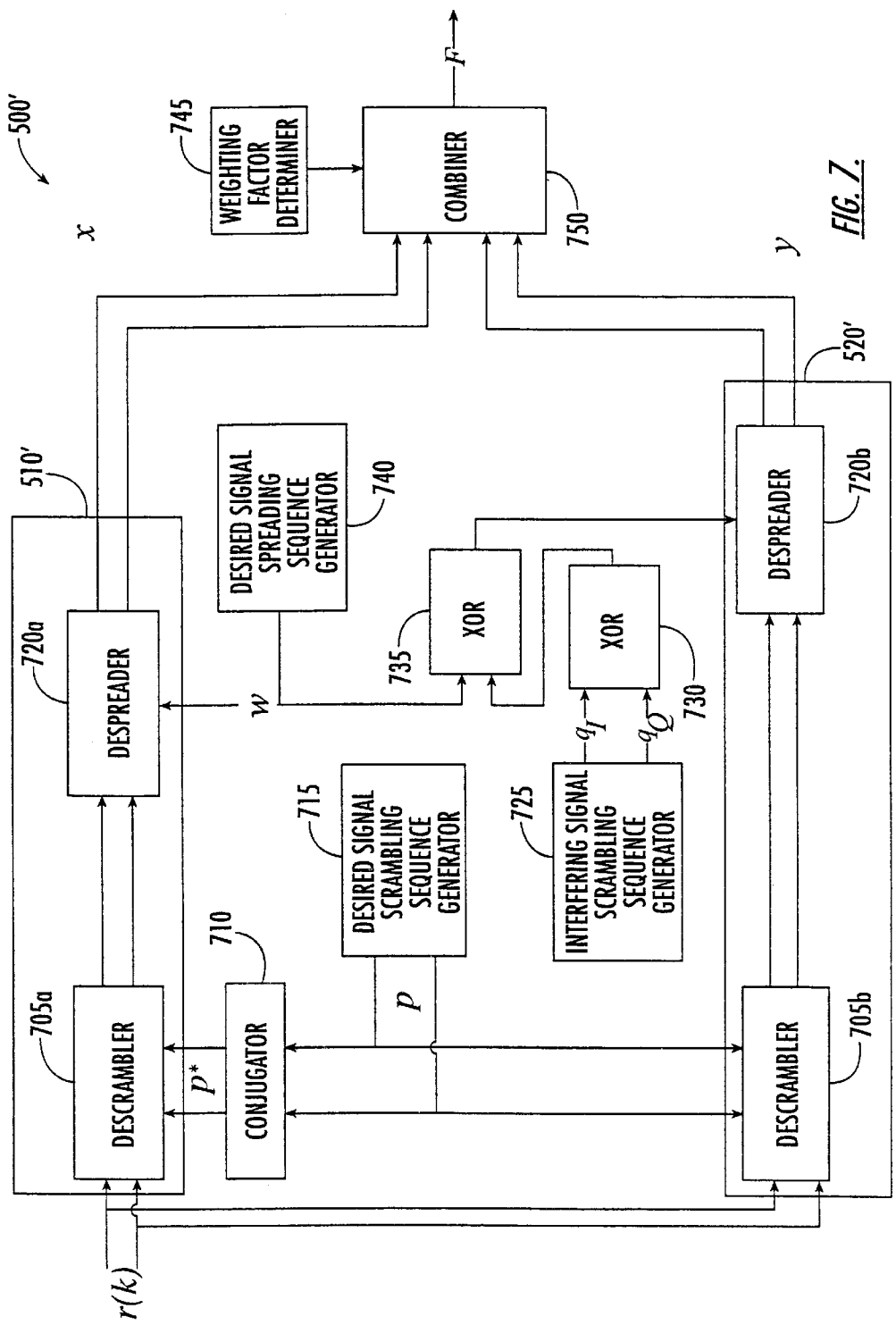
FIG. 7 is a schematic diagram illustrating a complex interference orthogonalizing baseband processor according to an embodiment of the present invention.

FIG. 7 illustrates a finger 500' for a complex interference orthogonalizing baseband processor, such as the baseband processor 394 of FIG. 5, according to another embodiment of the present invention. Here, a first correlator 510' is implemented as a series combination of a first descrambler 705a and a first despreader 720a that produces a first correlation output x, i.e., a conventional despread value from a baseband signal r(k) (here shown as complex value having I and Q components). A second correlator 520' is implemented as a series combination of a second descrambler 705b and a second despreader 720b that produces a second correlation output y, i.e., a multisignal despread value as described above. The first and second correlation outputs x,y are combined in a combiner 750 according to weighting factors generated by a weighting factor determiner 745, producing a finger output F. The weighting factor determiner 745 preferably determines weighting factors according to the zero-forcing approach described above with reference to equations (4)–(5), and more preferably, according to the combined zero-forcing/conventional RAKE approach described above with reference to equations (6)–(7).

The first descrambler 705a descrambles the baseband signal r(k) with the complex conjugate p* of a desired signal's scrambling sequence. The complex conjugate p* is produced by a conjugator 710 from a desired signal scrambling sequence p produced by a desired signal scrambling sequence generator 715. The first despreader 720a correlates descrambled values produced by the first descrambler 705a with a desired signal's spreading sequence w, produced by a desired signal spreading sequence generator 740, to generate the first correlation output x.

The second descrambler 705b descrambles the baseband signal r(k) with the desired signal's scrambling sequence p. The resulting descrambled values are correlated with a product of the desired signal's spreading sequence w and in-phase and quadrature components $q_I$, $q_Q$ of an interfering signal's scrambling sequence (produced by an interfering signal scrambling sequence generator 725), to produce the second correlation output y. The product of the desired signal's spreading sequence w and the in-phase and quadrature components $q_I$, $q_Q$ is generated using exclusive-OR (XOR) logic units 735, 730.

Signals transmitted in a cell of a wireless cellular system, such as one complying with the IS-95 standard, are commonly encoded using mutually orthogonal sequences, such as Walsh sequences. In a conventional correlator receiver, the orthogonality between such user signals is typically preserved, largely eliminating interference between these user signals. However, a receiver according to embodiments of the present invention may weight different chip values differently, which may result in interference arising from orthogonal-code signals after despreading. According to an aspect of the present invention, techniques may be provided that can improve performance in the presence of such orthogonal-code signal interference.

The zero-forcing I/Q projection solution described above can be viewed as rotating an interfering ray to the imaginary (I) axis and taking the real part of the result. If no rotation is performed, then orthogonality may be preserved, but generally at the cost of losing interference cancellation. If full rotation occurs, then orthogonality may be lost, but interference cancellation may be achieved. According to one aspect of the present invention, "balanced rotation" is performed such that orthogonality can be preserved while achieving interference cancellation. Balanced rotation can be understood by expressing the finger output $F_{combined}$ as:

$$F_{combined} = K_N Re\{c^*x\} + K_1|d|^2 Re\{c^*x + jc \exp\{-2j\theta_d\}y\}, \qquad (8)$$

where $\theta_d$ is the angle of complex channel coefficient d for the interfering ray. With balanced rotation, an additional rotation angle $\phi$ is introduced, producing a finger output $F_{BR}$:

$$F_{BR} = K_N Re\{c^*x\} + K_1|d|^2 Re\{c^*x + jc \exp\{-2j(\theta_d\phi)\}y\}. \qquad (9)$$

A rotation angle $\phi$ that reduces or eliminates orthogonal signal interference while partially canceling the interfering ray can be found by choosing a rotation angle $\phi$ such that:

1. $\cos(2(\Delta-\phi))=0$, thus preserving orthogonality; and
2. $\phi$ is as small as possible, to provide maximal interference cancellation while preserving orthogonality, where $$\Delta = \theta_c - \theta_d, \qquad (10)$$

is the relative angle between the channel coefficient c for the desired ray and the channel coefficient d for the interfering ray.

To achieve this, a target value $\theta$, for $(\Delta-\phi)$ is $\pm\pi/4(\pm 45°)$ or $\pm 3\pi/4(\pm 135°)$.

The quadrant in which Δ lies can be determined, and the target value $\theta_t$ is the possible solution lying in this quadrant. The desired rotation angle φ is given by:

$$\phi = \Delta - \theta_t. \quad (11)$$

The target value $\theta_t$ may be computed from:

$$\theta_t = \text{sign}\{\Delta\} \frac{(2 - \text{sign}\{\cos(\Delta)\})\pi}{4}, \quad (12)$$

where Δ is assumed to be in a range of -π (-180°) to π (180°). Performance may be optimized by introducing a control parameter $\gamma_b$ that "softly" turns balanced rotation "on" or "off" by using a scaling $\gamma_b \phi$.

According to another aspect of the present invention, an equalization approach is used to deal with orthogonal-code signal interference. According to this approach, chip samples are scaled such that orthogonal-code signal interference is reduced or eliminated. A chip equalization factor e(k) may be introduced into the ZF component of the combined finger output $F_{combined}$ to produce a finger output $F_{EQ}$:

$$F_{EQ} = K_1 Re\{c^* x\} + K_2 Re\{|d|^2 c^* x(e) + (-jddc^*)^* y(e)\}, \quad (13)$$

where $$x(e) = \sum_{k=1}^{64} w(k)e(k)p^*(k)r(k) \quad (14)$$

and $$y(e) = \sum_{k=1}^{64} w(k)e(k)q_I(k)q_Q(k)p(k)r(k). \quad (15)$$

Chips may be weighted equally while preserving orthogonality by choosing e(k) such that:

$$e(k) = \frac{1}{1 - O(k)\cos(2\Delta)}, \quad (16)$$

where $$O(k) = p_I(k)p_Q(k)q_I(k)q_Q(k). \quad (17)$$

O(k) has value of ±1, can be alternatively represented in Boolean values of 0 or 1 by exclusive-ORing the in-phase and quadrature components of the desired and interfering signal scrambling sequences. The two possible amplitude correction factors $e_1$, $e_2$ for e(k) are given by:

$$e_1 = \frac{1}{1 - \cos(2\Delta)} \quad (18)$$

and $$e_1 = \frac{1}{1 + \cos(2\Delta)} \quad (19)$$

Preferably, the correction factors $e_1$, $e_2$ are normalized such that one is equal to unity and the other is a value between 0 and 1.

In practical implementations it may be advantageous to accumulate samples that correspond to O(k)=+1 separately from samples corresponding to O(k)=-1. The equalization correction can then be applied after partial despreading.

According to this approach, the finger output $F_{EQ}$ can be expressed as:

$$F_{EQ} = Re\{f_x^*(1)x(1) + f_x^*(2)x(2) + f_y^*(1)y(1) + f_y^*(2)y(2)\}, \quad (20)$$

where x(1) and x(2) are partial sums that, together, give x, y(1) and y(2) are partial sums that, together, give y, and $f_x(1)$, $f_x(2)$, $f_y(1)$, and $f_y(2)$ are weighting factors. Which chip values go into which partial sums depends on an indicator function O(k), which in turn depends on the scrambling sequences of the desired signal and the interfering signal as follows:

1. when O(k) is positive, the despreading results are added to x(1) and y(1); and
2. when O(k) is negative, the despreading results are added to x(2) and y(2).

The weights $f_x(1)$, $f_x(2)$, $f_y(1)$, and $f_y(2)$ are preferably chosen to optimize performance. For example, if it is a goal to cancel the interfering signal without introducing any interference from orthogonal-code signals, then the weights $f_x(1)$, $f_x(2)$, $f_y(1)$, and $f_y(2)$ can be given by:

$$f_x(1) = K_{EQ}[\gamma c^* + e_1(1-\gamma)c^*], \quad (21)$$

$$f_x(2) = K_{EQ}[\gamma c^* + e_2(1-\gamma)c^*], \quad (22)$$

$$f_y(1) = K_{EQ} e_1 (1-\gamma) \frac{jcd^*d^*}{|d|^2}, \text{ and} \quad (23)$$

$$f_y(2) = K_{EQ} e_2 (1-\gamma) \frac{jcd^*d^*}{|d|^2}, \quad (24)$$

where $$K_{EQ} = \frac{1}{N[1 + (1-\gamma)^2 \Psi] + \gamma^2 |d|^2 I}, \quad (25)$$

$$\gamma = \frac{N\Psi}{N\Psi + I|d|^2}, \quad (26)$$

and $$\Psi = \frac{1}{2}\left(\frac{\sin(2\Delta)}{1 + \cos(2\Delta)}\right)^2 + \frac{1}{2}\left(\frac{\sin(2\Delta)}{1 - \cos(2\Delta)}\right)^2 \quad (27)$$

$$= \frac{1 + \cos^2(2\Delta)}{\sin^2(2\Delta)}.$$

Other weighting factors that trade off interferer power, orthogonal signal interference power, and other noise power can also be used. Equalization can also be turned on or off "softly," depending, for example, on relative levels of the interfering signal, the orthogonal-code signal interference, and other noise power. The equalization approach can also be combined with the balanced rotation approach described above; for example, equalization can be implemented using weighting factors that incorporate balanced rotation. For a given finger, selection of which interferer to cancel is preferably based on minimizing the denominator of $K_{EQ}$. This is equivalent to minimizing the interference-plus-noise power at the finger output, which ultimately maximizes the signal to interference plus noise ratio (SINR) of the finger output.

Adaptive filtering techniques can also be used to determine weighting factors. For example, an I/Q projection technique as described above can be used to detect a pilot channel or pilot symbols. Because the symbol value for the pilot channel or the pilot symbol is known, an error of the detected pilot channel symbol or pilot symbol with respect to the known symbol value can be used to adapt weighting factors using, for example, a least mean squares (LMS) adaptive filter technique. A hybrid approach is preferable, wherein the channel coefficients c and d are estimated and used in, for example:

$$F_{EQ} = K_1 Re\{c^* x\} + K_2 Re\{|d|^2 c^* x(e) + (-jddc^*)^* y(e)\}. \tag{27}$$

The scalar weights $K_1$ and $K_2$ can be determined using conventional adaptive techniques.

Figure 8:
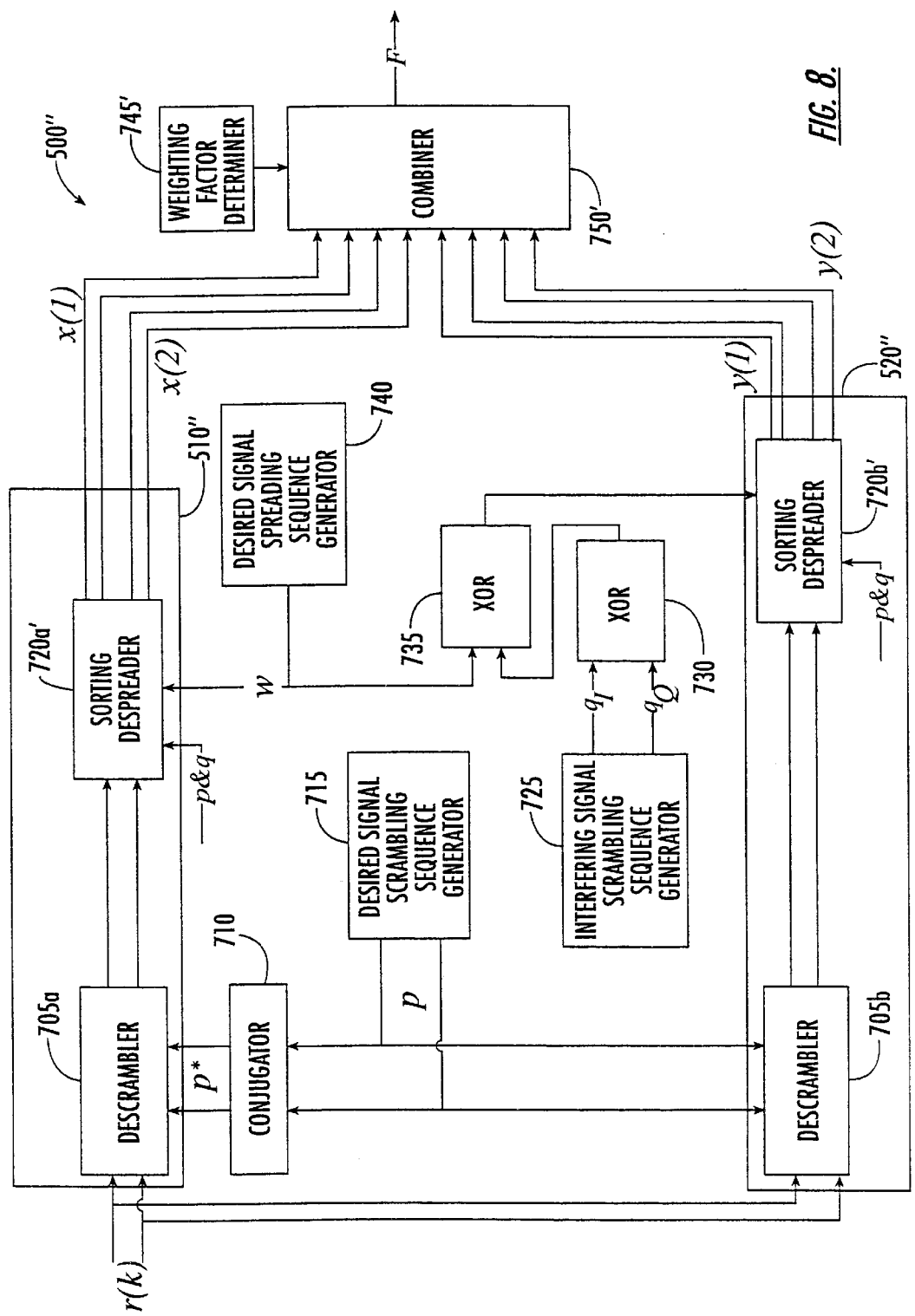
FIG. 8 is a schematic diagram illustrating an equalizing complex interference orthogonalizing baseband processor according to another embodiment of the present invention.

FIG. 8 illustrates a baseband processor finger 500" that implements equalization according to an embodiment of the present invention. The finger 500" includes a first correlator 510" that includes a first descrambler 705a as described above with reference to FIG. 7. Descrambled values produced by the first descrambler 705a are despread in a first sorting despreader 720a' that sorts correlation outputs into first and second subsets x(1), x(2), based on corresponding values of the desired signal and interferer signal scrambling sequences p, q. Similarly, a second correlator 520" includes a second descrambler 705b as described above with reference to FIG. 7. Descrambled values produced by the second descrambler 705b are despread in a second sorting despreader 720b' that sorts correlation outputs into first and second subsets y(1), y(2), based on corresponding values of the desired signal and interferer signal scrambling sequences p, q. The sorted correlation outputs x(1), x(2), y(1), y(2) are combined by a combiner 750' according to equalizing weighting factors generated by a weighting factor determiner 745' in the manner described above with reference to equation (21)–(27), producing a finger output F. Operations of other components of the finger 500" denoted by the same reference numerals as components of FIG. 7 will not be described further in light of the preceding description of these components with reference to FIG. 7.

Figure 9:
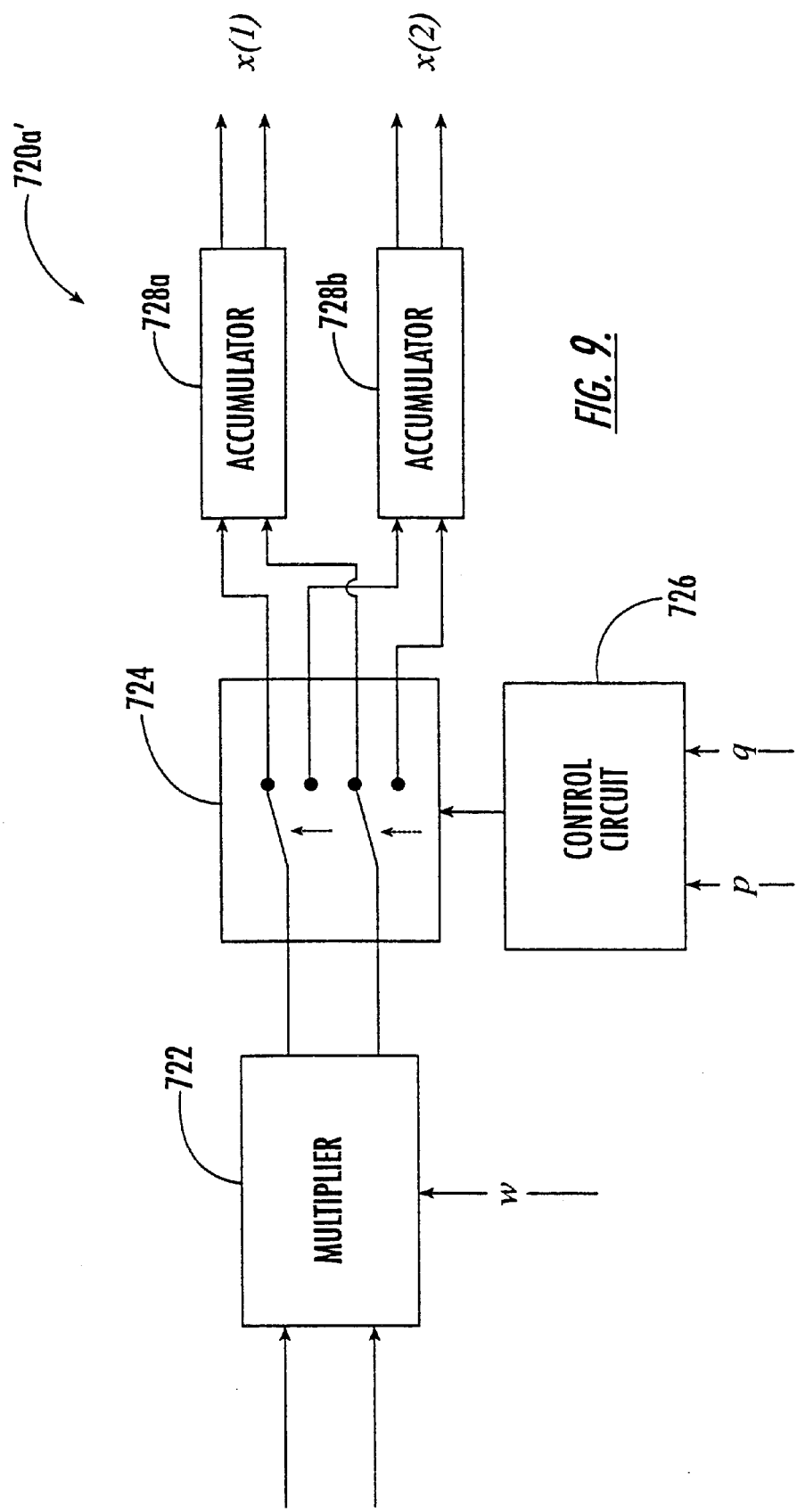
FIG. 9 is a schematic diagram illustrating a sorting despreader according to an embodiment of the present invention.

FIG. 9 illustrates an exemplary implementation for the first sorting despreader 720a' of FIG. 8. The sorting despreader includes a multiplier 722 that multiplies descrambled outputs produced by the first descrambler 705a by the desired signal's spreading sequence w. The outputs of the multiplier 722 are selectively routed to first and second accumulators 728a, 728b by a switch 724, responsive to a control signal generated by a control circuit 726. The accumulators 728a, 728b store respective sets of correlation outputs x(1), x(2). The control circuit 726 generates the control signal based on corresponding values of the desired and interfering signal scrambling sequences p, q, for example, based on the value of an indicator function such as the function O(k) described above. It will be appreciated that the second sorting despreader 720b of FIG. 8 may be implemented in a similar fashion.

Although the present invention has been described in an environment in which interference is chip-synchronous to the desired signal ray, the present invention is also applicable to interference that is chip asynchronous to the desired signal ray. When interference is chip asynchronous, it can be viewed as a composite of multiple chip-synchronous interferers, each of which has an amplitude that depends on the transmit chip pulse shape and receiver filtering operations. Each interfering image may be viewed as having a main lobe image and sidelobe images arising from the ringing of the transmit and receiver filters. The present invention can treat the largest of these images as a chip-synchronous interferer to be canceled, and treat the rest of the images as noise. When the interferer is an echo of the desired signal, then one of the sidelobe images may be orthogonal to the desired signal. Such an image preferably is not canceled or included when estimating noise power.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of recovering information from a communications signal that includes components associated with first and second signals that are modulated according to respective first and second modulation sequences, the method comprising the steps of:

processing the communications signal to generate a baseband signal;

correlating the baseband signal with the first modulation sequence to produce a first correlation output;

correlating the baseband signal with a combination of the first modulation sequence and a complex component of the second modulation sequence to generate a second correlation output; and combining the first and second correlation outputs to generate an estimate of information represented by the first signal.

2. A method according to claim 1, wherein the second signal is modulated according to a complex scrambling sequence, and wherein said step of correlating the baseband signal with a combination of the first modulation sequence and a complex component of a second modulation sequence comprises the step of correlating the baseband signal with a combination of the first modulation sequence and the complex scrambling sequence.

3. A method according to claim 1, wherein the first signal is modulated according to a combination of a first scrambling sequence and a first spreading sequence, wherein the second signal is modulated according to a combination of a second scrambling sequence and a second spreading sequence, and:

wherein said step of correlating the baseband signal with the first modulation sequence comprises the steps of:

descrambling the baseband signal with a complex conjugate of the first scrambling sequence to generate a first plurality of descrambled values;

correlating the first plurality of descrambled values with the first spreading sequence to generate the first correlation output;

wherein said step of correlating the baseband signal with a combination of the first modulation sequence and a complex component of the second modulation sequence comprises the steps of:

descrambling the baseband signal with the first scrambling sequence to generate a second plurality of descrambled values; and correlating the second plurality of descrambled values with a product of the first spreading sequence, an in-phase component of the second scrambling sequence and a quadrature component of the second scrambling sequence to generate the second correlation output.

4. A method according to claim 3, wherein said step of correlating the second plurality of descrambled values is preceded by the step of identifying the second scrambling sequence.

5. A method according to claim 4, wherein said step of identifying the second scrambling sequence comprises the step of detecting a signal encoded according to the second scrambling sequence.

6. A method according to claim 5:
wherein said step of detecting comprises the step of detecting a plurality of signals; and
wherein said step of identifying the second scrambling sequence comprises the step of identifying a scrambling sequence associated with a strongest one of the detected plurality of signals.

7. A method according to claim 3, wherein said step of combining comprises the steps of:
combining the first and second correlation outputs to produce a first RAKE finger output; and
combining the first RAKE finger output with a second RAKE finger output to generate an estimate of information represented by the first signal.

8. A method according to claim 3, wherein said step of combining the first and second correlation outputs comprises the step of combining the first and second correlation outputs according to channel estimates for the first and second signals.

9. A method according to claim 8, further comprising the step of estimating noise power and interference power, and wherein said step of combining the first and second correlation outputs comprises the step of combining the first and second correlation outputs according to the estimated noise power and interference power.

10. A method according to claim 3, further comprising the step of determining a set of weighting factors, and wherein said step of combining the first and second correlation outputs comprises the step of combining the first and second correlation outputs according to the determined set of weighting factors.

11. A method according to claim 10, wherein said step of determining a set of weighting factors comprises the step of adaptively determining weighting factors from at least one of known information or estimated information.

12. A method according to claim 3, wherein the communications signal includes a component associated with a third signal that is modulated according to a combination of the first scrambling sequence and a third spreading sequence that is orthogonal to the first spreading sequence, and:
wherein said step of combining the first and second correlation outputs is preceded by the step of determining a minimum rotation angle that minimizes interference associated with the third signal; and
wherein said step of combining the first and second correlation outputs comprises the step of combining the first and second correlation outputs according to the determined minimum rotation angle.

13. A method according to claim 3, wherein the communications signal includes a component associated with a third signal that is modulated according to a combination of the first scrambling sequence and a third spreading sequence that is orthogonal to the first spreading sequence, and:
wherein said step of combining the first and second correlation outputs is preceded by the step of equalizing the first and second correlation outputs to control interference associated with the third signal; and
wherein said step of combining the first and second correlation outputs comprises the step of combining the equalized first and second correlation outputs.

14. A method according to claim 13:
wherein said step of correlating the first plurality of descrambled values with the first spreading sequence comprises the steps of:
multiplying the first plurality of descrambled values by the first spreading sequence to generate scaled descrambled values;
sorting the scaled descrambled values into first and second sets based on corresponding values of an indicator function comprising a product of in-phase and quadrature components of the first and second scrambling sequences; and
accumulating respective ones of the first and second sets of scaled descrambled values to generate respective first and second sets of partial correlation output values;
wherein said step of correlating the second plurality of descrambled values with a product of the first spreading sequence, an in-phase component of the second scrambling sequence and a quadrature component of the second scrambling sequence comprises the steps of:
multiplying the second plurality of descrambled values by a product of the first spreading sequence, an in-phase component of the second scrambling sequence and a quadrature component of the second scrambling sequence to generate scaled descrambled values;
sorting the scaled descrambled values into third and fourth sets based on corresponding values of the indicator function; and
accumulating respective ones of the third and fourth sets of scaled descrambled values to generate respective third and fourth sets of partial correlation output values; and
wherein said step of combining the first and second correlation outputs comprises the step of combining the first, second, third and fourth sets of partial correlation output values.

15. A method according to claim 14, wherein the first, second, third and fourth partial correlation outputs are accumulated using weights that are each functions of channel estimates, noise power estimates and interference power estimates.

16. A receiver for processing a communications signal that includes components associated with first and second signals that are modulated according to respective first and second modulation sequences, the receiver comprising:
a converter operative to produce a baseband signal from the communications signal; and
a complex interference orthogonalizing baseband processor responsive to the converter and operative to correlate the baseband signal with the first modulation sequence to produce a first correlation output, to correlate the baseband signal with a combination of the first modulation sequence and a complex component of the second modulation sequence to generate a second correlation output, and to combine the first and second correlation outputs to generate an estimate of information represented by the first signal.

17. A receiver according to claim 16, wherein the complex interference orthogonalizing baseband processor comprises:
a first correlator operative to correlate the baseband signal with the first modulation sequence to produce a first correlation output;
a second correlator operative to correlate the baseband signal with a combination of the first modulation sequence and a complex component of the second modulation sequence to generate a second correlation output; and
a combiner responsive to the first and second correlators and operative to combine the first and second correlation outputs to generate an estimate of information represented by the first signal.

18. A receiver according to claim 17, wherein the second signal is modulated according to a complex scrambling sequence, and wherein the second correlator is operative to correlate the baseband signal with a combination of the first modulation sequence and the complex scrambling sequence.

19. A receiver according to claim 17, wherein the first signal is modulated according to a combination of a first scrambling sequence and a first spreading sequence, wherein the second signal is modulated according a combination of a second scrambling sequence and a second spreading sequence, and:
   wherein the first correlator comprises:
      a first descrambler operative to descramble the baseband signal with a complex conjugate of the first scrambling sequence to generate a first plurality of descrambled values;
      a first despreader operative to correlate the first plurality of descrambled values with the first spreading sequence to generate the first correlation output;
   wherein said second correlator comprises:
      a second descrambler operative to descramble the baseband signal with the first scrambling sequence to generate a second plurality of descrambled values; and
      a second despreader operative to correlate the second plurality of descrambled values with a product of the first spreading sequence, an in-phase component of the second scrambling sequence and a quadrature component of the second scrambling sequence to generate the second correlation output.

20. A receiver according to claim 19, wherein said combiner comprises:
   a first combiner operative to combine the first and second correlation outputs to produce a first RAKE finger output; and
   a second combiner operative to combine the first RAKE finger output with a second RAKE finger output to generate an estimate of information represented by the first signal.

21. A receiver according to claim 19, wherein said combiner is operative to combine the first and second correlation outputs according to channel estimates for the first and second signals.

22. A receiver according to claim 21, wherein said combiner is operative to combine the first and second correlation outputs according to estimates of noise power and interference power.

23. A receiver according to claim 19, wherein the complex interference orthogonalizing baseband processor further comprises a weighting factor determiner operative to determine a set of weighting factors, and wherein the combiner is operative to combine the first and second correlation outputs according to the determined weighting factors.

24. A receiver according to claim 23, wherein said weighting factor determiner is operative to adaptively determine weighting factors from at least one of known information or estimated information.

25. A receiver, comprising:
   means for producing a baseband signal from a communications signal that includes components associated with first and second signals that are modulated according to respective first and second modulation sequences;
   means for correlating the baseband signal with the first modulation sequence to produce a first correlation output;
   means for correlating the baseband signal with a combination of the first modulation sequence and a complex component of the second modulation sequence to generate a second correlation output; and
   means for combining the first and second correlation outputs to generate an estimate of information represented by the first signal.

26. A receiver according to claim 25, wherein the second signal is modulated according to a complex scrambling sequence, and wherein said means for correlating the baseband signal with a combination of the first modulation sequence and a complex component of a second modulation sequence comprises means for correlating the baseband signal with a combination of the first modulation sequence and the complex scrambling sequence.

27. A receiver according to claim 25, wherein the first signal is modulated according to a combination of a first scrambling sequence and a first spreading sequence, wherein the second signal is modulated according a combination of a second scrambling sequence and a second spreading sequence, and:
   wherein said means for correlating the baseband signal with the first modulation sequence comprises:
      means for descrambling the baseband signal with a complex conjugate of the first scrambling sequence to generate a first plurality of descrambled values;
      means for correlating the first plurality of descrambled values with the first spreading sequence to generate the first correlation output;
   wherein said means for correlating the baseband signal with a combination of the first modulation sequence and a complex component of the second modulation sequence comprises:
      means for descrambling the baseband signal with the first scrambling sequence to generate a second plurality of descrambled values; and
      means for correlating the second plurality of descrambled values with a product of the first spreading sequence, an in-phase component of the second scrambling sequence and a quadrature component of the second scrambling sequence to generate the second correlation output.

28. A receiver according to claim 27, further comprising means for identifying the second scrambling sequence.

29. A receiver according to claim 28, wherein said means for identifying the second scrambling sequence comprises means for detecting a signal encoded according to the second scrambling sequence.

30. A receiver according to claim 29:
   wherein said means for detecting comprises means for detecting a plurality of signals; and
   wherein said means for identifying the second scrambling sequence comprises means for identifying a scrambling sequence associated with a strongest one of the detected plurality of signals.

31. A receiver according to claim 27, wherein said means for combining comprises:
   means for combining the first and second correlation outputs to produce a first RAKE finger output; and
   means for combining the first RAKE finger output with a second RAKE finger output to generate an estimate of information represented by the first signal.

32. A receiver according to claim 27, wherein said means for combining the first and second correlation outputs comprises means for combining the first and second correlation outputs according to channel estimates for the first and second signals.

33. A receiver according to claim 32, further comprising means for estimating noise power and interference power, and wherein said means for combining the first and second correlation outputs comprises means for combining the first and second correlation outputs according to the estimated noise power and interference power.

34. A receiver according to claim 27, further comprising means for determining a set of weighting factors, and wherein said means for combining the first and second correlation outputs comprises means for combining the first and second correlation outputs according to the determined weighting factors.

35. A receiver according to claim 34, wherein said means for determining a set of weighting factors comprises means for adaptively determining weighting factors from at least one of known information or estimated information.

36. A receiver according to claim 27, wherein the communications signal includes a component associated with a third signal that is modulated according to a combination of the first scrambling sequence and a third spreading sequence that is orthogonal to the first spreading sequence, wherein the receiver further comprises means for determining a minimum rotation angle that minimizes interference associated with the third signal, and wherein said means for combining the first and second correlation outputs comprises means for combining the first and second correlation outputs according to the determined minimum rotation angle.

37. A receiver according to claim 27, wherein the communications signal includes a component associated with a third signal that is modulated according to a combination of the first scrambling sequence and a third spreading sequence that is orthogonal to the first spreading sequence, wherein the receiver further comprises means for equalizing the first and second correlation outputs to control interference associated with the third signal, and wherein said means for combining the first and second correlation outputs comprises means for combining the equalized first and second correlation outputs.

38. A receiver according to claim 37:
wherein said means for correlating the first plurality of descrambled values with the first spreading sequence comprises:
  means for multiplying the first plurality of descrambled values by the first spreading sequence to generate scaled descrambled values;
  means for sorting the scaled descrambled values into first and second sets based on corresponding values of an indicator function comprising a product of in-phase and quadrature components of the first and second scrambling sequences; and
  means for accumulating respective ones of the first and second sets of scaled descrambled values to generate respective first and second sets of partial correlation output values;
wherein said means for correlating the second plurality of descrambled values with a product of the first spreading sequence, an in-phase component of the second scrambling sequence and a quadrature component of the second scrambling sequence comprises:
  means for multiplying the second plurality of descrambled values by a product of the first spreading sequence, an in-phase component of the second scrambling sequence and a quadrature component of the second scrambling sequence to generate scaled descrambled values;
  means for sorting the scaled descrambled values into third and fourth sets based on corresponding values of the indicator function; and
  means for accumulating respective ones of the third and fourth sets of scaled descrambled values to generate respective third and fourth sets of partial correlation output values; and
wherein said means for combining the first and second correlation outputs comprises means for combining the first, second, third and fourth sets of partial correlation output values.

39. A receiver according to claim 38, wherein the first, second, third and fourth set of partial correlation output values are accumulated using weights that are each functions of channel estimates, noise power estimates and interference power estimates for the first and second signals.

* * * * *